United States Patent [19]

Ito

[11] Patent Number: 6,151,066
[45] Date of Patent: Nov. 21, 2000

[54] IMAGE-SENSING CONTROL METHOD AND APPARATUS, IMAGE SENSING SYSTEM, AND STORAGE MEDIUM CONTAINING PROGRAM FOR EXECUTING IMAGE-SENSING CONTROL METHOD

[75] Inventor: Kan Ito, Tokyo, Japan

[73] Assignee: Canon Kabushiki Kaisha, Tokyo, Japan

[21] Appl. No.: 08/802,278

[22] Filed: Feb. 19, 1997

[30] Foreign Application Priority Data

Feb. 20, 1996 [JP] Japan .................................. 8-032139
Dec. 27, 1996 [JP] Japan .................................. 8-350384

[51] Int. Cl.$^7$ .................................................. H04N 5/225
[52] U.S. Cl. ........................... 348/169; 382/103; 370/62
[58] Field of Search ............................ 348/169, 15, 12, 348/36, 211, 212, 213, 214; 359/124; 345/121, 330

[56] References Cited

U.S. PATENT DOCUMENTS

| | | | |
|---|---|---|---|
| 5,218,627 | 6/1993 | Corey et al. .............................. | 379/53 |
| 5,477,546 | 12/1995 | Shibata et al. ............................ | 348/15 |
| 5,652,849 | 7/1997 | Conway et al. .......................... | 395/327 |
| 5,686,957 | 11/1997 | Baker ........................................ | 348/36 |
| 5,818,616 | 10/1998 | Kawai ....................................... | 359/124 |
| 5,835,129 | 11/1998 | Kumar ....................................... | 348/15 |
| 5,838,368 | 11/1998 | Masunaga et al. ..................... | 348/211 |
| 5,896,128 | 4/1999 | Boyer ........................................ | 348/12 |
| 5,898,459 | 4/1999 | Smith et al. ............................. | 348/214 |
| 5,926,209 | 7/1999 | Glatt ......................................... | 348/211 |
| 6,008,837 | 12/1999 | Yonezawa ................................. | 348/15 |

Primary Examiner—Howard Britton
Assistant Examiner—Shawn S. An
Attorney, Agent, or Firm—Morgan & Finnegan, LLP

[57] ABSTRACT

An image sensing system, including visual telephone and teleconference terminals, connected via a network. Each terminal has a video camera placed on a pan head, and can display a video image sensed by the video camera connected to the terminal and a video image sensed by a video camera of a communication-destination terminal, on a monitor connected to the terminal. Each terminal detects whether or not the video camera is placed on the remote-controllable pan head, and mutually transmits the result of detection to its communication-destination terminal. At each terminal, if the direction of the video camera can be controlled by the pan head, a pan-head control panel is displayed with the video image from the video camera, on the monitor. Further, if the video camera of the communication-destination terminal is placed on a remote-controllable pan head, a pan-head control panel for the pan head of the communication-destination terminal is displayed with the video image from the communication-destination terminal, on the monitor.

25 Claims, 10 Drawing Sheets

IMAGE-SENSING CONTROL METHOD AND APPARATUS, IMAGE SENSING SYSTEM, AND STORAGE MEDIUM CONTAINING PROGRAM FOR EXECUTING IMAGE-SENSING CONTROL METHOD

BACKGROUND OF THE INVENTION

This invention relates to an image-sensing control method, image-sensing apparatus and image-sensing system, for transmitting still image information or moving image information between terminals at remote places connected via a network or a public telephone-line network, and a storage medium containing a program for executing the image-sensing control method.

These days, many visual-telephone and teleconference systems employ an ISDN line. The ITU-T H. 320 Recommendations include the N-ISDN AV (Audio Visual) system configuration and terminal construction. Further, the recommendations on the telephone line network are now being developed to cover a general public telephone-line network, as recommendations H. 324 on a low-bit rate visual-telephone multimedia terminal.

The multimedia terminal or a representative element for the visual-telephone and teleconference system is a video camera which inputs a sensed video image. The video camera includes a camera placed on a pan head such that the video camera can be freely rotated in a horizontal direction or a vertical direction in accordance with an external control signal. In addition, a video camera integrated with such pan head is known. In a visual-telephone and teleconference system using the video camera integrated with the pan head or the pan head, the image sensing direction of a video camera at a remote place, e.g., a video camera of a communication-destination terminal, can be remote-controlled. FIG. 7 shows an overview of the video camera integrated with the pan-head. In this video camera, a camera 70 is placed on a pan head 72. The video camera may have another arrangement where the camera 70 can be separated from the pan head 72.

In the conventional visual-telephone and teleconference system, if the video camera of the communication-destination terminal is not placed on a remote-controllable pan head, e.g., in a case where the video camera initially set on the pan head is removed from the pan head, or in a case where the image sensing direction of the video camera cannot be remote-controlled, the status of the camera of the communication-destination terminal cannot be determined. Especially, there is no way of determining whether or not the video camera is placed on the pan head, otherwise, even if it is placed on the pan head, whether or not the pan head can be remote-controlled cannot be determined. This is very inconvenient for controlling the video camera of the communication destination station.

SUMMARY OF THE INVENTION

The present invention has been made in consideration of the above situation, and has its object to provide an image-sensing control method and apparatus, image sensing system which can easily determine whether or not direction control means can control image sensing direction of image sensing means, and a storage medium containing a program for executing the image-sensing control method.

Further, another object of the present invention is to provide an image-sensing control method and apparatus, image sensing system which can easily determine the function of image sensing means, and a storage medium containing a program for executing the image-sensing control method.

Further, another object of the present invention is to provide an image-sensing control method and apparatus, image sensing system which can easily determine whether or not image sensing direction of image sensing means and that of image sensing means of a communication-destination terminal, connected to each other via a transmission line, can be controlled, and a storage medium containing a program for executing the image-sensing control method.

Further, another object of the present invention is to provide an image-sensing control method and apparatus, image sensing system which can easily determine the function of image sensing means and that of image sensing means of a communication-destination terminal, connected to each other via a transmission line, and a storage medium containing a program for executing the image-sensing control method.

Further, another object of the present invention is to provide an image-sensing control method and apparatus, image sensing system which can easily determine whether or not image sensing direction of image sensing means can be controlled, and which can easily determine the function of the image sensing means, further which can easily control the image sensing direction and function of the image sensing means, by using a displayed operation panel, and a storage medium containing a program for executing the image-sensing control method.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

[First Embodiment]

Figure 1:
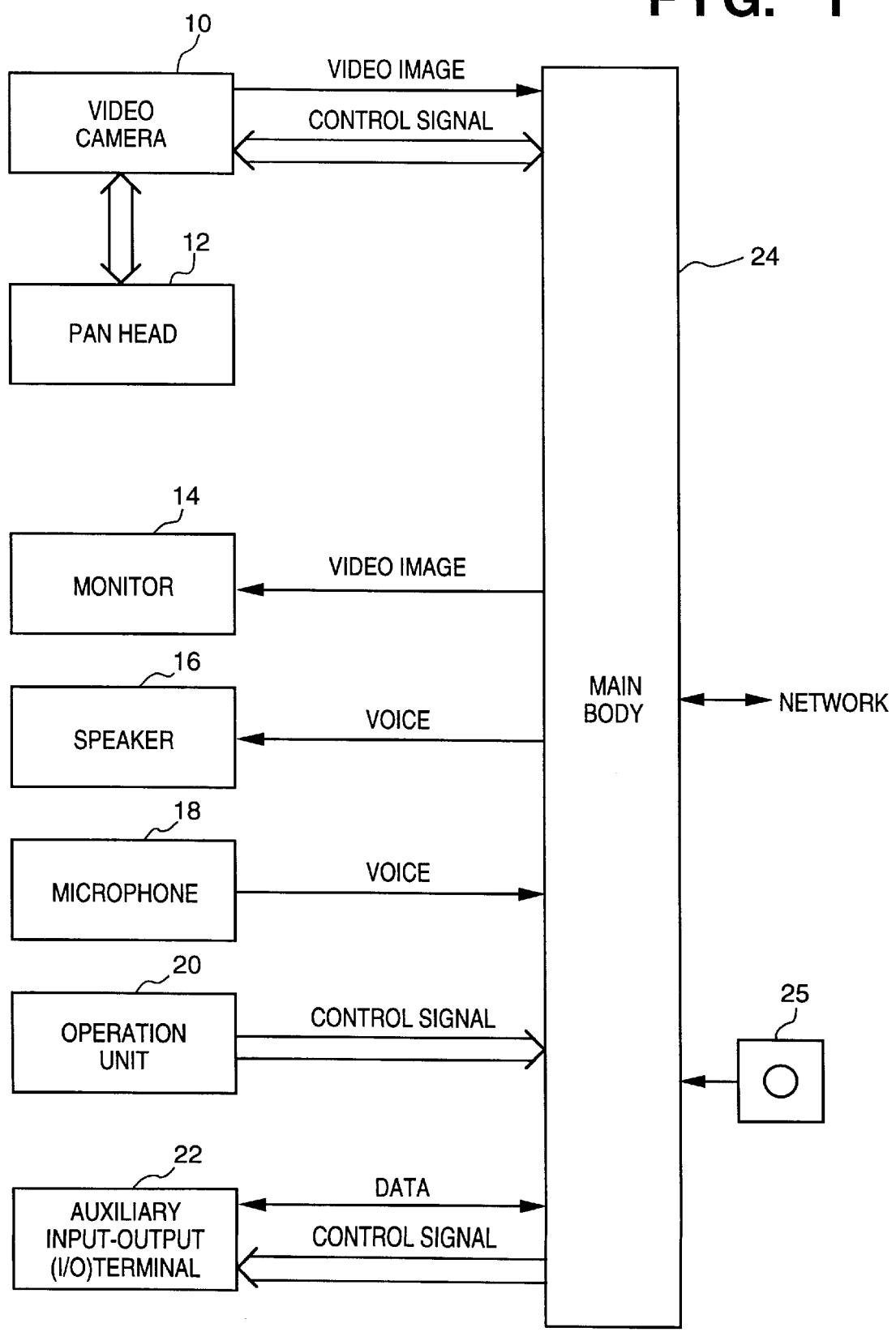
FIG. 1 is a block diagram showing a visual-telephone and teleconference terminal according to a first embodiment of the present invention.

FIG. 1 is a block diagram of a visual-telephone and teleconference terminal according to a first embodiment of the present invention. Note that the following description will be made using the visual-telephone and teleconference terminal, however, the present invention is not limited to this arrangement. For example, the present invention can be applied to an image sensing system where panning and tilting of a video camera set at a remote place is controlled via a network or the like, and a video image obtained by the video camera can be seen via the network.

In FIG. 1, reference numeral 10 denotes a video camera which image-senses a conference attendant and the like at the visual-telephone and teleconference terminal in FIG. 1; 12, a pan head which can be controlled from an external device to change an image sensing direction (panning or tilting) of the video camera 10; 14, a monitor which displays the image of a conference attendant obtained by the video camera 10 of the terminal in FIG. 1 or an image from another terminal; 16, a speaker; 18, a microphone; 20, an operation unit for inputting operation information to control panning, tilting, zooming and the like of the video camera 10 of the terminal in FIG. 1 or that of another terminal, and to control switching the video cameras; 22, an auxiliary input-output (I/O) terminal having general computer's input devices such as a keyboard, a mouse and a digitizer, an input unit for inputting a still image and the like, and a sub-monitor for displaying an image from another auxiliary I/O terminal; 24, a main body of the visual-telephone and teleconference terminal; and 25, a magnetic disk containing a control program for executing processing according to the present embodiment. The control program stored in the magnetic disk 25 is read out into a memory and executed under the control of a computer 40 in FIG. 2.

Figure 2:
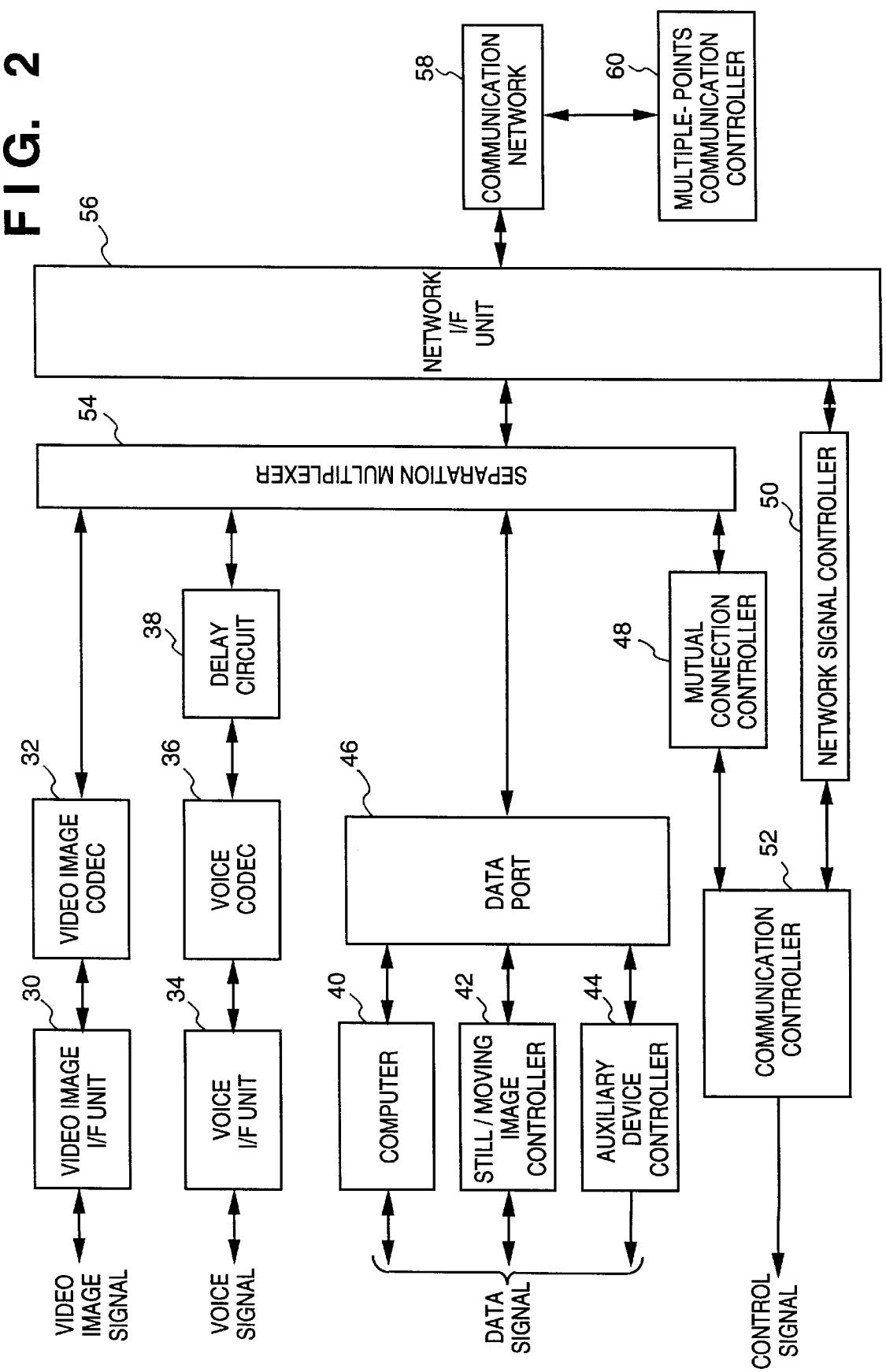
FIG. 2 is a block diagram showing a main body of the visual-telephone and teleconference terminal in FIG. 1.

FIG. 2 is a block diagram of the terminal main body 24 of the present embodiment.

In FIG. 2, numeral 30 denotes a video interface (I/F) unit which inputs a video image signal from the video camera 10 and outputs the video image signal to the monitor 14. The video I/F unit 30 has image processing functions such as image dividing, image combining and character synthesizing. Numeral 32 denotes a video-image encoder/decoder (CODEC) which encodes the video image signal inputted from the video camera 10 via the video I/F unit 30, and decodes a coded video image signal received via a network or the like. Numeral 34 denotes a voice interface (I/F) unit which outputs a voice signal to the speaker 16, and inputs a voice signal from the microphone 18 and outputs the signal to a voice encoder/decoder (CODEC) 36. The voice I/F unit 34 has video processing functions such as echo processing or echo-cancel processing. The voice CODEC 36 encodes the voice signal from the voice I/F unit 30, and decodes coded voice information received from the network or the like. Numeral 38 denotes a delay circuit which delays the coded voice signal from the voice CODEC 36 and a received coded voice signal by a predetermined delay period, for lip synchronization with the video image signal.

Numeral 40 denotes a computer which provides a teleconference function and a computer-conference function; 42, a still/moving image controller which controls still-image input/output and picturing input/output of the auxiliary I/O terminal 22; 44, an auxiliary device controller which controls the auxiliary devices of the auxiliary I/O terminal 22; 46, a data port which performs data transfer with the auxiliary I/O terminal 22 via the computer 40, the still/moving image controller 42, the auxiliary I/O terminal 42 and the auxiliary device controller 44.

Numeral 48 denotes a mutual connection controller which controls mutual connection with another visual-telephone and teleconference terminal via a network; 50, a network signal controller which performs end-to-end control to establish a common mode for communication between the terminals; 52, a communication controller which controls communication by using the mutual connection controller 48 and the network signal controller 50; 54, a separation multiplexer which performs multiplexing for multiplex transmission of a video image signal, a voice signal and various control information, and performs separation on multiplexed signals; 56, a network interface (I/F) unit for connection with a communication network 58; 60, a multiple-points communication controller which mutually connects the visual-telephone and teleconference terminals at many places, thus enabling visual telephone and teleconference connecting the many points.

In the above construction, when a visual-telephone/teleconference is started, a communication link is established with a remote terminal in accordance with a normal procedure. After the communication link has been normally established, it is detected whether or not the video camera 10 and the pan head 12 of the present terminal 24 are connected. The detected information is transmitted, as a data signal, to the communication-destination terminal via the data port 46. This data-signal transmission is mutually performed at each terminal. After the data has been received, a control image is displayed on the monitor 14 in accordance with connection status between the video camera 10 and the pan head 12 of the present terminal 24 and that of the communication-destination terminal.

Figure 3:
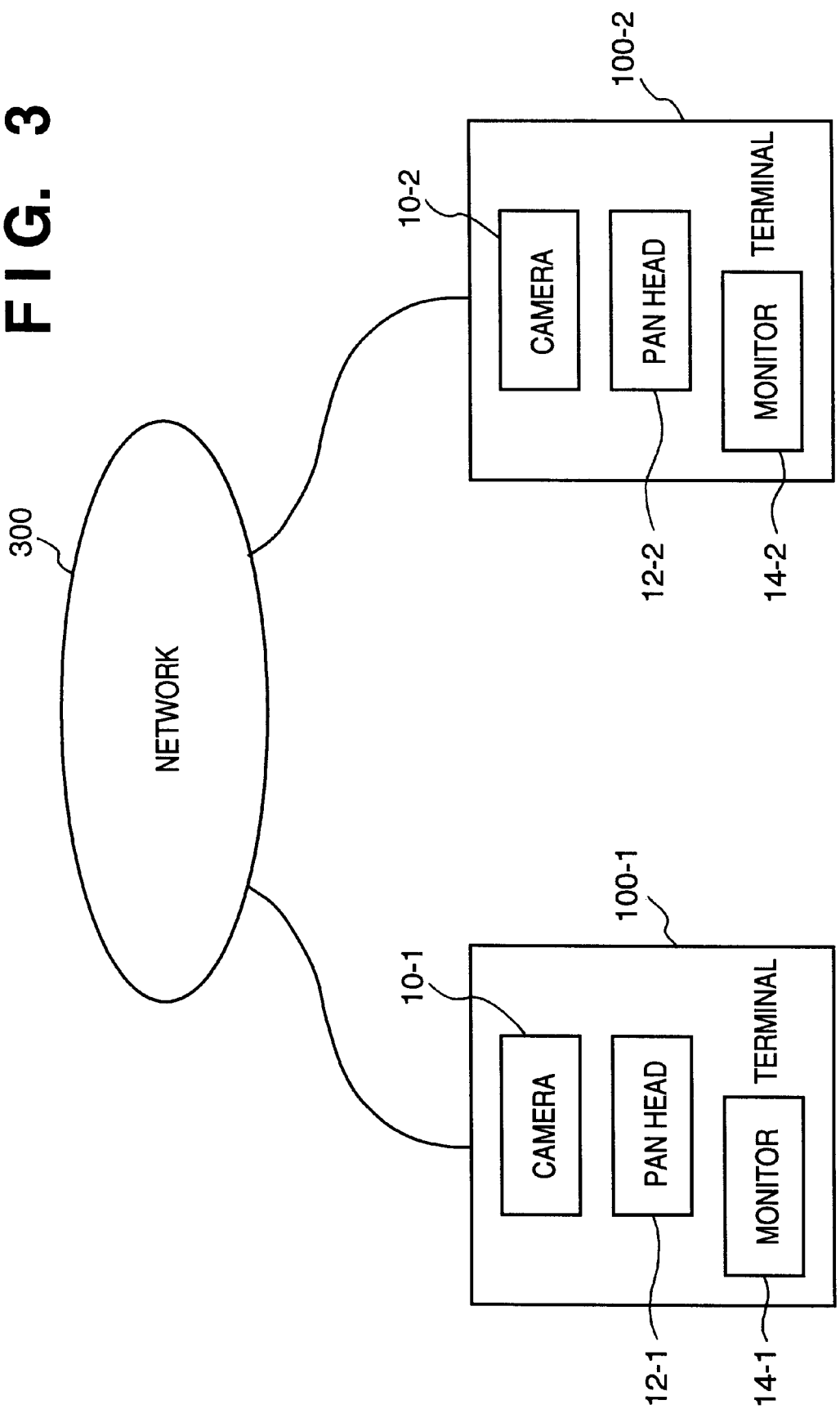
FIG. 3 is a block diagram showing the concept of a network connecting the visual-telephone and teleconference terminals of the first embodiment.

FIG. 3 shows the concept of the network connected to the terminal of the present embodiment.

In FIG. 3, numeral 300 denotes a communication network such as a public switch network or the Internet; 100-1 and 100-2, the visual-telephone and teleconference terminals, both having the same construction as shown in FIG. 1; 10-1 and 10-2 correspond to the video camera 10 as described above; 12-1 and 12-2, the pan head 12 as described above; and 14-1 and 14-2, the monitor 14 as described above. Note that in FIG. 3, for the purpose of simplification, the network 300 is connected to two terminals, however, the present invention is not limited to this number of terminals.

Figure 4:
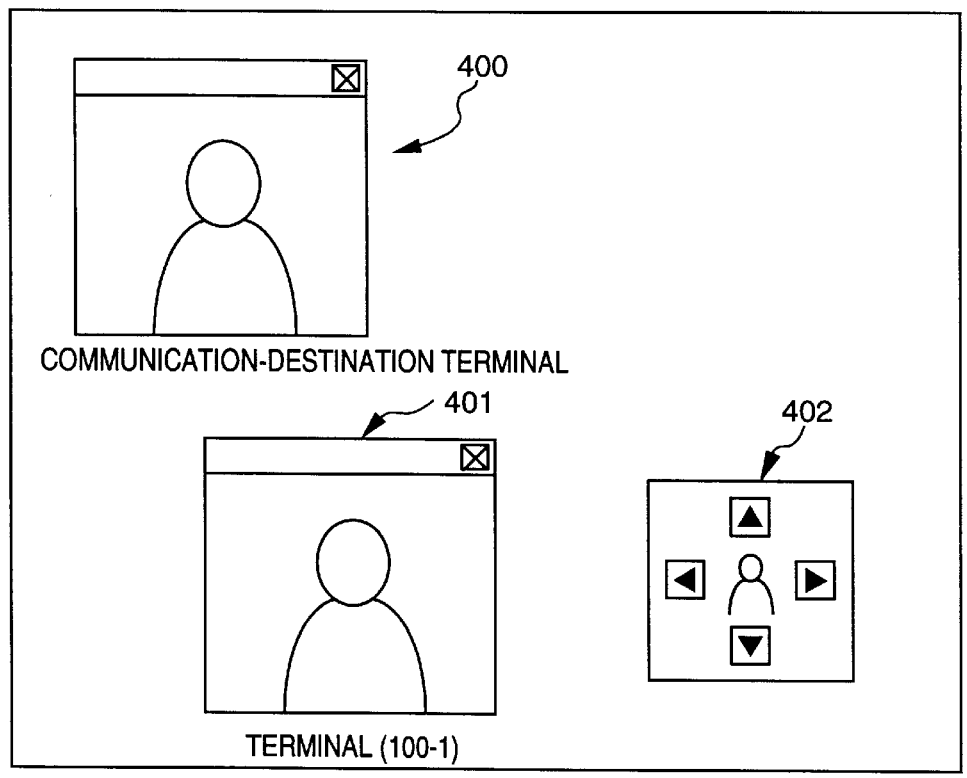
FIG. 4 is a display example on a monitor screen of the terminal of the first embodiment.

FIG. 4 shows a display example on the monitor 14-1 of the terminal 100-1. The video camera 10-1 of the terminal 100-1 is mounted on the pan head 12-1, but the video camera 10-2 of the terminal 100-2 is not mounted on the pan head 12-2.

In FIG. 4, numeral 400 denotes a window showing a video image sensed by the video camera 10-2 of the terminal 100-2 and transmitted via the network 300; 401, a window showing a video image sensed by the video camera 10-1 of the terminal 100-1; 402, a pan-head control panel for controlling the pan head 12-1 of the terminal 100-1. In FIG. 4, the pan-head control panel 402 for controlling the pan head 12-1 of the terminal 100-1 is displayed but a pan-head control panel for controlling the pan head 12-2 of the terminal 100-2 is not displayed; i.e., this indicates that the pan head 12-2 of the terminal 100-2 cannot be controlled from the terminal 100-1. However, if the video camera 12-2 of the terminal 100-2 has a zooming function, a manual focusing function and the like, a control panel of these functions is displayed, and zooming and the like of the video camera 10-2 of the terminal 100-2 can be operated.

Figure 5:
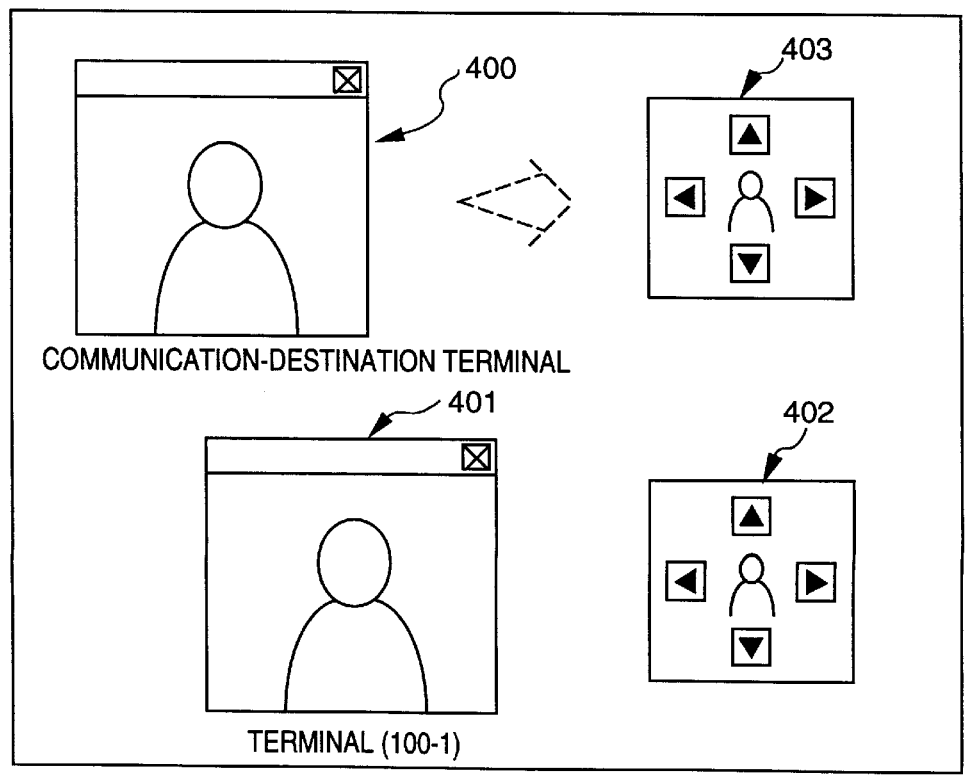
FIG. 5 is another display example of the monitor screen of the terminal of the first embodiment.

Assuming that during a visual-telephone/teleconference, the video camera 10-2 of the terminal 100-2, that was not mounted on the pan head 12-2, has been placed on the pan head 12-2, the image sensing direction of the video camera 10-2 becomes remote-controllable. Then, that situation is detected, and on the terminal 100-2 side, the pan-head control panel 402 corresponding to the terminal 100-2 is displayed on the monitor 14-2, as shown in FIG. 5. At the same time, the terminal 100-1 is informed that the image-sensing direction of the video camera 10-2 has become remote-controllable. Then, on the terminal 100-1 side, a pan-head control panel 403 for controlling the pan head 12-2 of the terminal 100-2 is displayed on the monitor 14-1, as shown in FIG. 5. By operating the control panel 403 on the monitor 14-1, the pan head 12-2 of the terminal 100-2 can be remote-controlled.

FIG. 5 shows a display example on the monitor 14-1 when the video camera 10-2 is placed on the pan head 12-2 at the terminal 100-2. Thus, when the image sensing direction of the video camera 10-2 has become remote-controllable, on the monitor 14-1 of the terminal 100-1, the pan-head control panel 403 is popped out from the window 400 showing the video image from the terminal 100-2.

Figure 6:
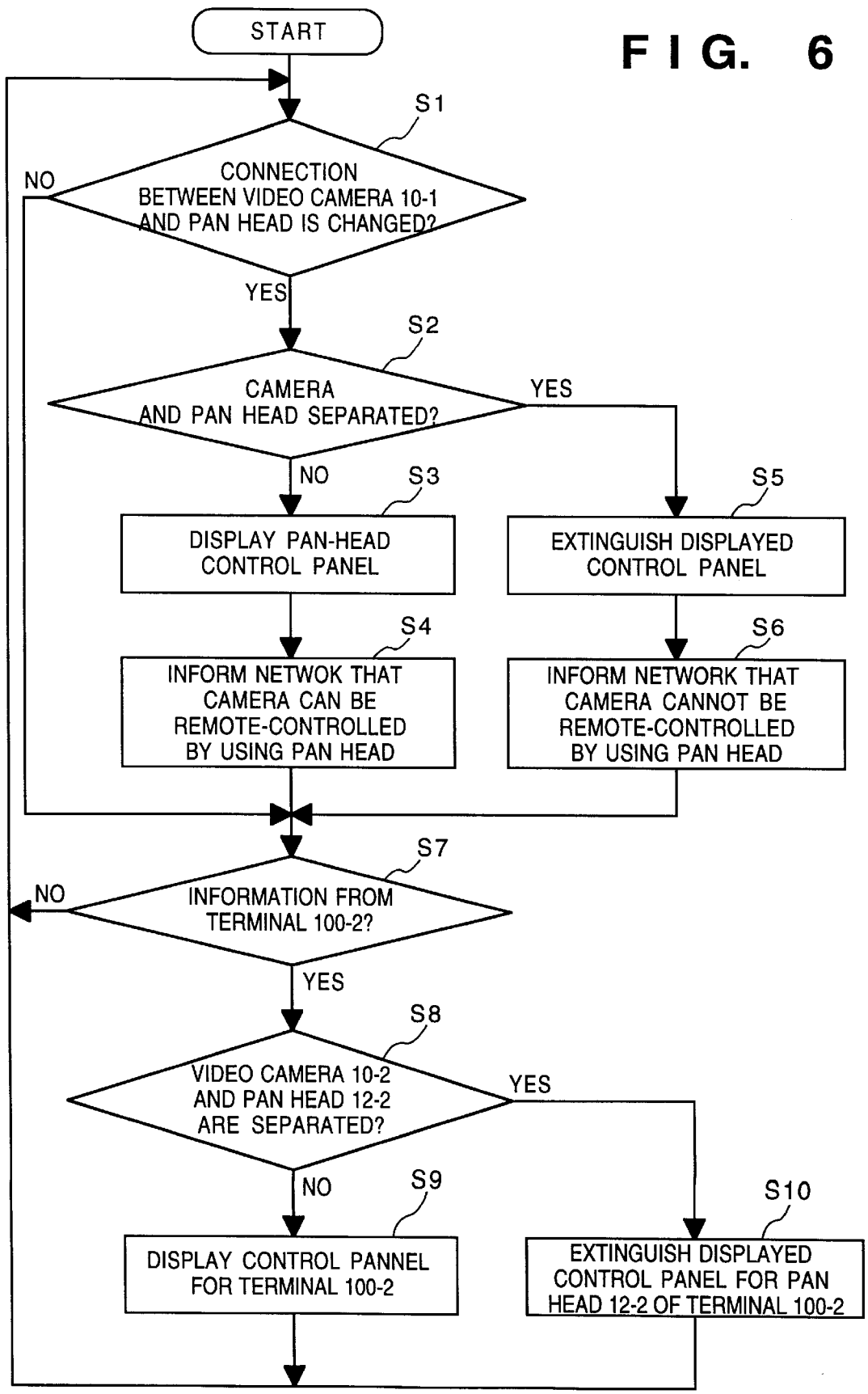
FIG. 6 is a flowchart showing a process procedure of the visual-telephone and teleconference terminal according to the first embodiment.
Figure 7:
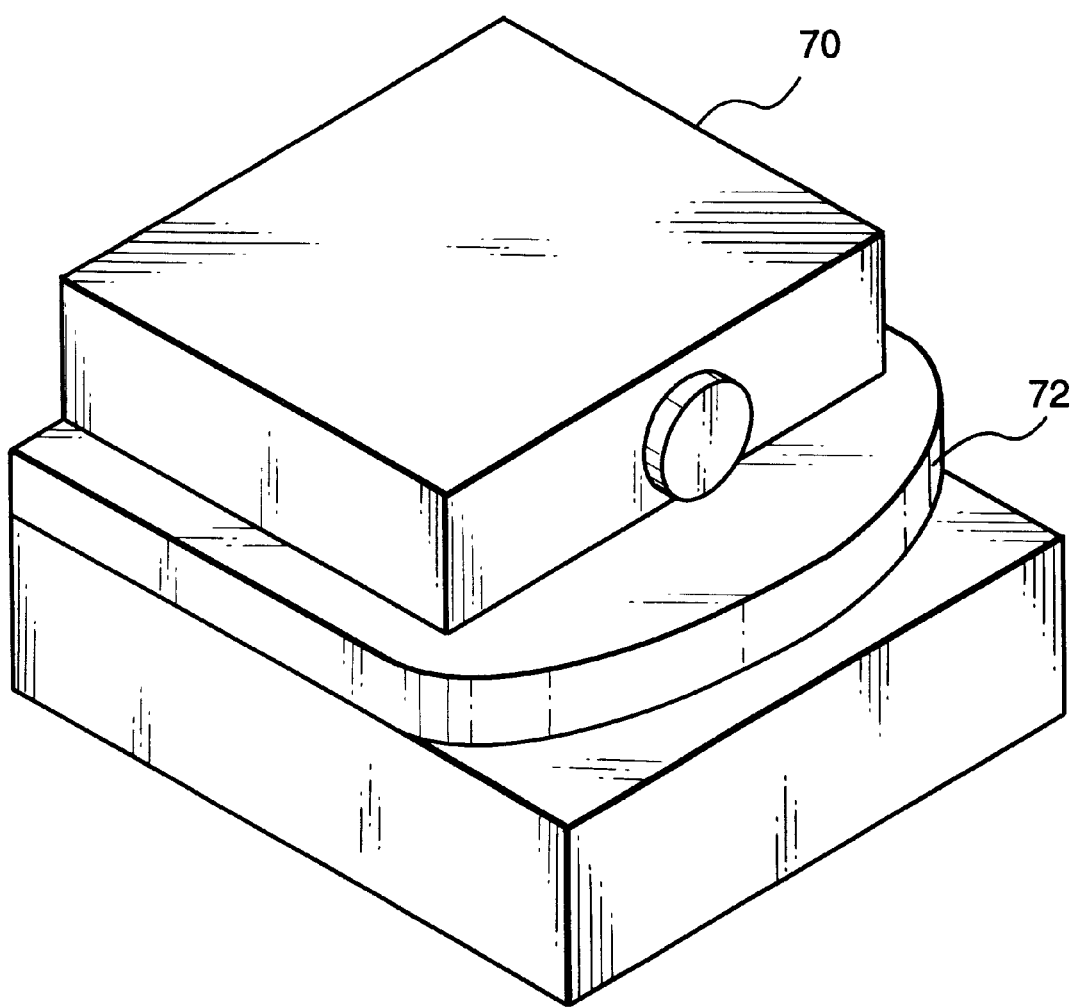
FIG. 7 is an overview of a video camera integrated with a pan-head.

FIG. 6 shows a process procedure of the visual-telephone conference terminal according to the present embodiment. Note that description will be made with reference to FIG. 3.

At step S1 in FIG. 6, it is examined whether or not the connection between the video camera 10-1 and the pan head 12-1 of the terminal 100-1 has been changed. If there has been no change in the connection, the process proceeds to step S7, at which processing to be described later is performed. If it is determined at step S1 that the connection between the video camera 10-1 and the pan head 12-1 has been changed, the process proceeds to step S2, at which it is examined whether or not the video camera 10-1 and the pan head 12-1 have been separated from each other, i.e., the image sensing direction of the video camera 10-1 has become uncontrollable. If NO, i.e., the video camera 10-1 and the pan head 12-1 has been connected, the process proceeds to step S3, at which a pan-head control panel 402 is displayed by the side of the window 401 showing a video image from the terminal 100-1. At step S4, the status where the video camera 10-1 can be operated by controlling the pan head 12-1 of the terminal 100-1 is notified to the network 300. On the other hand, if it is determined at step S2 that the video camera 10-1 and the pan head 12-1 are separated from each other, the process proceeds to step S5, at which the pan-head control panel 402 displayed by the window showing the video image from the terminal 100-1 is extinguished. At step S6, the status where the video camera 10-1 cannot be operated by controlling the pan head 12-1 of the terminal 100-1 is notified to the network 300. Note that the extinction of the pan-head control panel is not merely to delete the control panel on the display screen out. It may be arranged such that the display of the panel is thinned or to grayed out/faded out. Hereinafter, the "extinction of control panel display" includes these methods.

At step S7, it is examined whether or not information on connection between the video camera 10-2 and the pan head 12-2 of the communication-destination terminal 100-2 has been inputted via the network 300. If NO, the process returns to step S1. If YES, process proceeds to step S8, at which it is examined whether or not the video camera 10-2 and the pan head 12-2 of the terminal 100-2 are separated from each other. If the video camera 10-2 and the pan head 12-2 has been connected, the process proceeds to step S9, at which the pan-head control panel 403 is popped out and displayed by the window 400 showing a video image from the terminal 100-2. On the other hand, when the video camera 10-2 and the pan head 12-2 has been separated from each other, the process proceeds to step S10, at which the pan-head control panel 403 displayed by the window 400 showing the video image from the terminal 100-2 is extinguished.

As described above, according to the present embodiment, regarding a video camera (image-sensing means) and a pan head (image-sensing direction control means) are detachable from each other, the connection status between the video camera and the pan head, i.e., whether or not the video camera of the communication-destination terminal can be remote-controlled is immediately known. This enables smooth visual-telephone and teleconference.

[Second Embodiment]

Next, a construction where it is confirmed on the monitor of the terminal whether or not the video camera 10 has functions such as auto-focusing (AF) function, auto-exposure (AE) function, in addition to the construction of the first embodiment, will be described as a second embodiment of the present invention.

Figure 8:
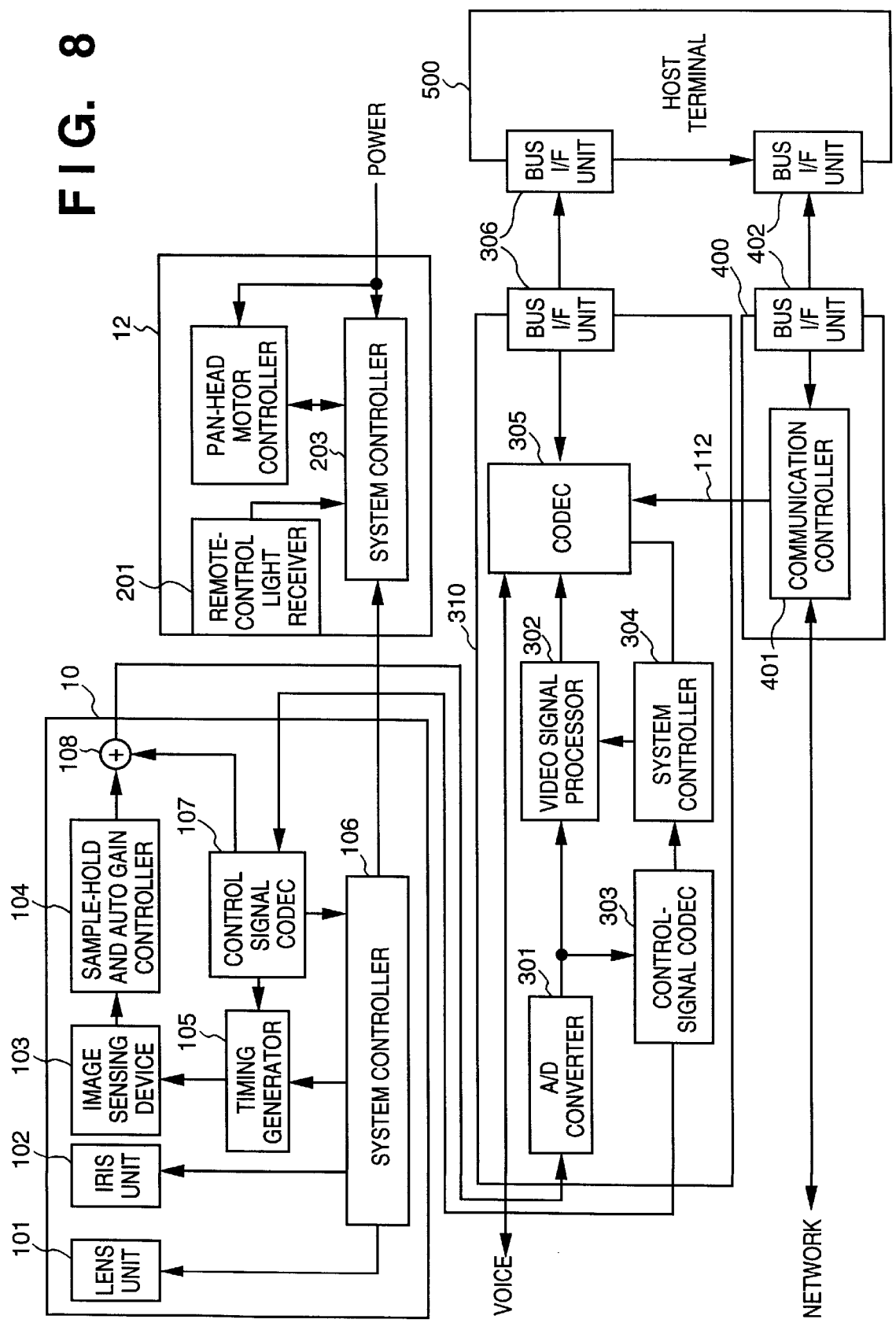
FIG. 8 is a block diagram showing the construction of a terminal used in a visual-telephone and teleconference system according to a second embodiment.

FIG. 8 shows the construction of the visual-telephone and teleconference terminal according to the second embodiment. In FIG. 8, the elements corresponding to those in FIG. 1 have the same reference numerals.

As shown in FIG. 8, the terminal (24) of the second embodiment has the video camera 10, the pan head 12, a signal processor 310, a communication unit 400 and a host terminal 500. The video camera 10 and the pan head 12 are connected via a bidirectional control signal line 110. The video camera 10 outputs signals obtained by multiplexing various control signals to the signal processor 310, while the signal processor 310 outputs a video-image synchronizing signal (Sync) and various control signals to the video camera 10. The signal processor 310 and the communication unit 400 are connected via a bidirectional signal line 112. The host terminal 500 is connected to the signal processor 310 and the communication unit 400, respectively via bus interface (I/F) units 306 and 402. Based on the above connections, the signal processor 310, the pan head 12 and the video camera 10 are controlled from the host terminal 500 via the bus I/F units 306, and the communication unit 400 is controlled from the host terminal 500 via the bus I/F units 402.

Next, the construction of the video camera 10 will be described.

Numeral 106 denotes a system controller having a CPU such as a microprocessor, a RAM, a ROM, a control port, a communication port and the like. The system controller 106 controls the respective units of the video camera 10, and performs bidirectional communication with the pan head 12 and the signal processor 310. Numeral 101 denotes a lens unit having a zooming function, a focusing function and the like; 102, an iris unit for adjusting the quantity of incident light that passes through the lens unit 101; 103, an image sensing device such as a CCD which photoelectric-converts an optical image passed through the lens unit 101 and the iris unit 102 into an electric signal; 104, a sample-hold and auto gain controller (S/H AGC) which performs sampling on the video image signal from the image sensing device 103, performs sample-holding on the sampled video image signal for the purpose of noise reducing, and controls the gain of the sample-held video image signal; 105, a timing generator (TG) as an image-sensing device driver which controls storing the video image signal, reading the stored video image signal, and resetting, in accordance with the number of pixels of the image sensing device 103; and 107, a control signal encoder/decoder (CODEC) which separates the video synchronizing signal (Sync) from the signal processor 310 into a horizontal synchronizing signal (HD) and a vertical synchronizing signal (VD) and sends the signals to the timing generator 105, at which the drive timing for the image sensing device 103 is determined based on the signals. Further, the control signal CODEC 107 sets the control signal from the system controller 106 during a vertical retrace line deletion period of a CCD signal, or contrary, extracts the control signal set during the vertical retrace line deletion period of the CCD signal from the signal processor 310 and sends the extracted control signal to the system controller 106. In this manner, the control signal CODEC 107 performs separation on a synchronizing signal and coding/decoding on a control signal. Numeral 108 denotes a multiplex circuit which multiplexes a CCD signal from the S/H AGC 104 with the control signal from the control signal CODEC 107, and transfers the multiplexed signal to the signal processor 310.

Next, the construction of the pan head 12 will be described.

Numeral 203 denotes a system controller having a CPU such as a microprocessor, a ROM, a RAM, a control port, a communication port and the like. The system controller 203 controls the respective units of the pan head 12, and performs bidirectional communication with the video camera 10 via the signal line 110. Numeral 201 denotes a remote-control light receiver which receives infrared light from a wireless remote controller and transfers information based on the infrared light to the system controller 203; and 202, a pan-head motor controller which drives a motor for panning and tilting of the pan head 12 based on a control signal from the system controller 203. Note that power for driving the motor is supplied from an external power source (not shown).

Next, the construction of the signal processor 310 will be described.

Numeral 304 denotes a system controller having a CPU such as a microprocessor, a ROM, a RAM, a control port, a communication port and the like. The system controller 304 controls the respective units of the signal processor 310 for auto white-balance control and the like. Further, the system controller 304 performs communication with the video camera 10, communication with the pan head 12 via the video camera 10, and communication with the host terminal 500 via the bus I/F units 306. Further, the system controller 304 interprets a command sent from the host terminal 500, and controls execution of operation requested by the host terminal 500.

Numeral 301 denotes an A/D converter which converts a video image signal transferred from the video camera 10 into a digital signal; and 302, a video signal processor which converts the digital video image signal from the A/D converter 301, through color-signal processing, into a standardized digital video image signal. The video signal processor 302 sends brightness data of an object, used for exposure control, data for white-balance control, data for focusing control, to the system controller 304, which performs the respective controls. The standardized digital signal is encoded by an encoder/decoder (CODEC) 305 with a voice signal and other data signal from the host terminal 500, and transmitted via the communication controller 401. Note that the CODEC 305 has the same construction as that of CODECs 32 and 36 in FIG. 2, therefore the explanation of the CODEC 305 will be omitted.

In the above construction, when a visual-telephone/teleconference is started, a communication link is established with a remote terminal in accordance with a normal procedure. After the communication link has been established, the status of the video signal processor 310, the video camera 10 and the pan head 12, and whether or not the video camera 10 and the pan head 12 are connected with each other, are detected. The detected information is transmitted, as a data signal, to the communication-destination terminal via the data port 46. This data-signal transmission is mutually performed at each terminal. After the data has been received, a control image is displayed on the monitor 14 of the host terminal 500 in accordance with the status of the video camera 10 and the pan head 12, the connection status therebetween, the status of the camera 10 and the pan head 12 of the communication-destination terminal, and the connection status therebetween.

Figure 9:
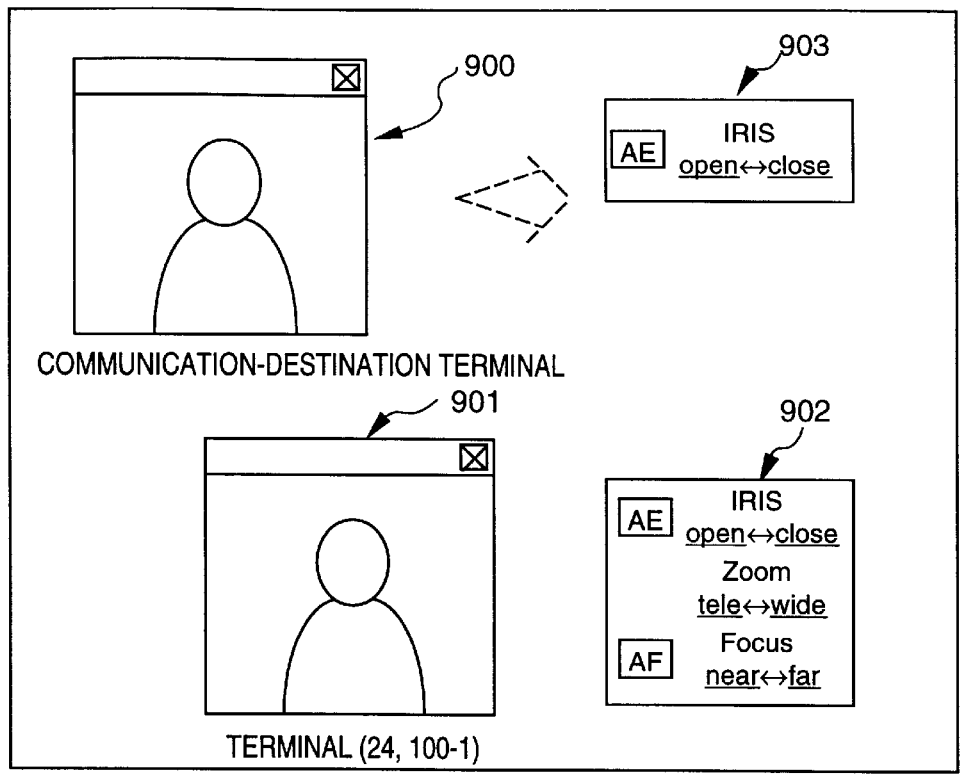
FIG. 9 is a display example on the monitor screen of the second embodiment.

FIG. 9 shows a display example on the monitor 14 of the second embodiment. In FIG. 9, the video camera 10 having an auto-focusing function, an auto-exposure function and an zooming function is connected to the terminal 24. On the other hand, the video camera 10 merely having the auto-exposure function is connected to the communication-destination terminal.

Figure 10:
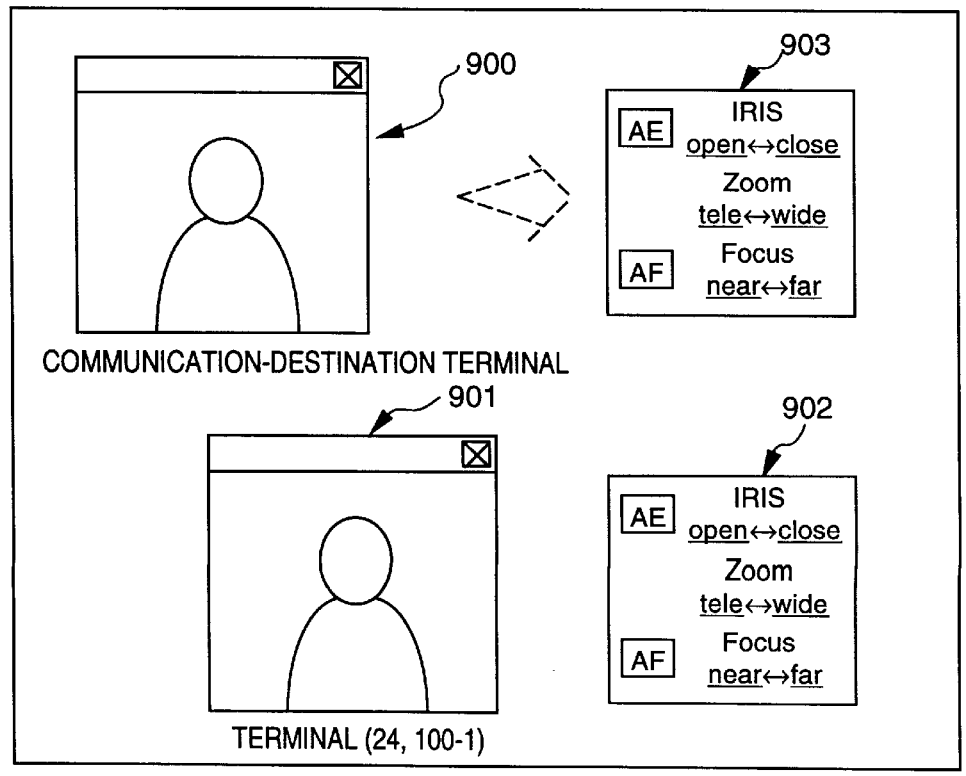
FIG. 10 is an another display example on the monitor screen of the second embodiment.

In FIG. 9, numeral 900 denotes a window showing a video image sensed by the video camera 10 of the communication-destination terminal; and 901, a window showing a video image sensed by the terminal 24. Numeral 902 denotes a control panel for controlling the video camera 10 of the terminal 24, which shows operation status of exposure control, zooming, and focusing; i.e., it indicates that these functions are controllable. However, a control panel 903 of the communication-destination terminal merely shows operation status of exposure control; i.e., it indicates that the other functions are not controllable. On the communication-destination terminal side, if the video camera 10 is replaced with another video camera having the auto-focusing function, the auto-exposure function, and the zooming function, the control panel 903 shows operation status of the exposure control, zooming, and focusing, i.e., it indicates that these functions are controllable, as shown in FIG. 10.

As shown in FIG. 4, when the camera 10 and the pan head 12 of the terminal 24 are connected, while the camera 10 and the pan head 12 of the communication-destination terminal are not connected, or they are connected but the power of the pan head 12 is not on, the monitor image merely shows the pan-head control panel 402. As the pan-head control panel of the communication-destination terminal is not displayed, it indicates that the pan head 12 of the communication-destination terminal cannot be controlled.

Further, it is assumed that during visual-telephone/teleconference, the video camera 10 of any terminal, that was not mounted on the pan head 12, has been placed on the pan head 12, otherwise, the power of the pan head 12 connected to the video camera 10 has been turned on, and the image sensing direction of the video camera 10 has become remote-controllable. Then, that situation is detected, and the pan-head control panel 402 corresponding to the terminal 24 is displayed on the monitor 14 of the terminal, as shown in FIG. 4. At the same time, the communication-destination terminal (hereinafter 24') is informed that the image sensing direction of the video camera 10 of the terminal 24 has become remote-controllable. Then, on the communication-destination terminal 24' side, the pan-head control panel 403 for operating the pan head 12 of the terminal 24 is popped out from the window 400 showing the video image from the communication-destination terminal, and displayed by the window 400. By operating the control panel 403 on the monitor 14, the pan head 10 of the terminal 24 can be remote-controlled.

Figure 11:
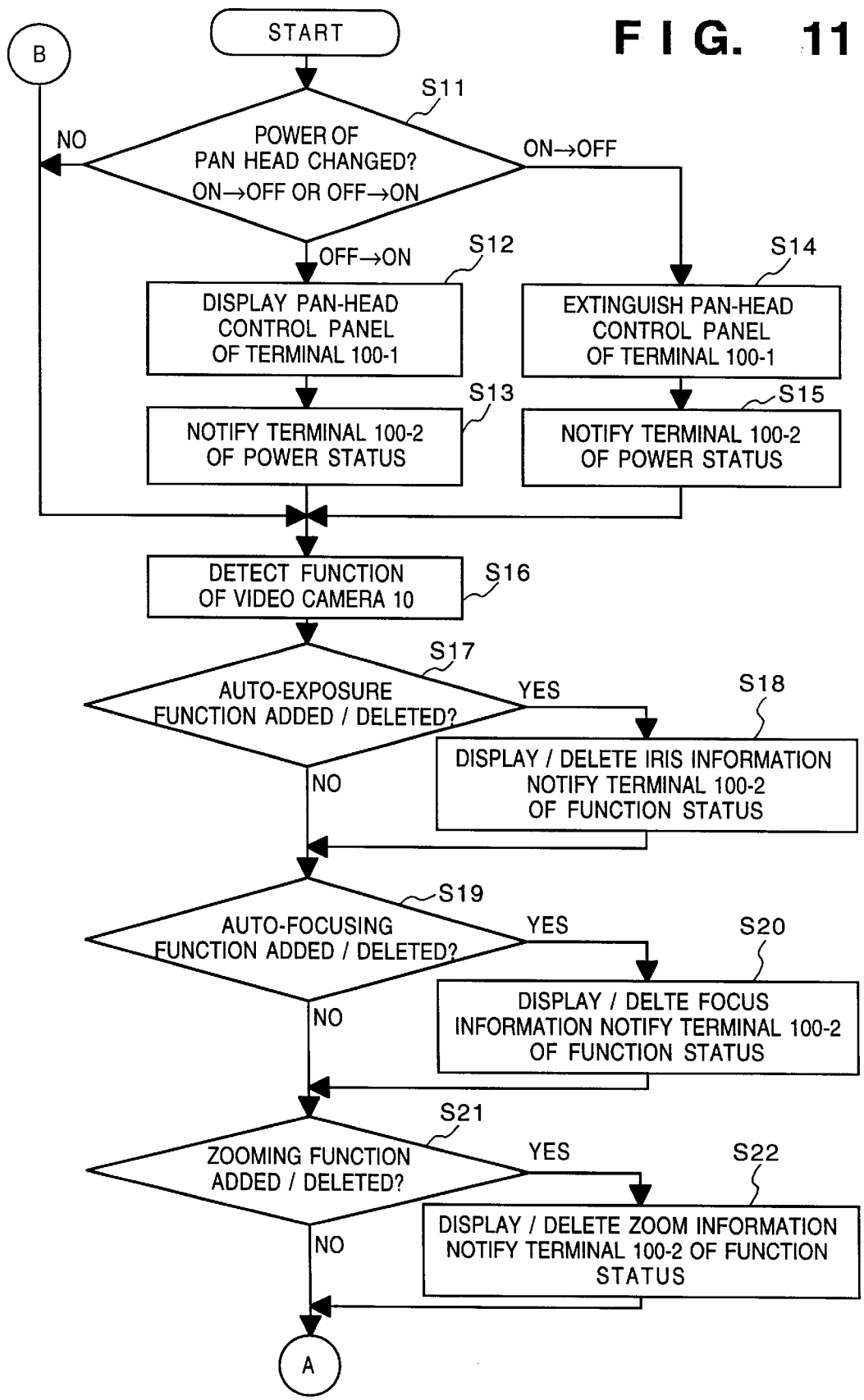
FIGS. 11 and 12 are flowcharts showing a process procedure by the terminal according to the second embodiment.
Figure 12:
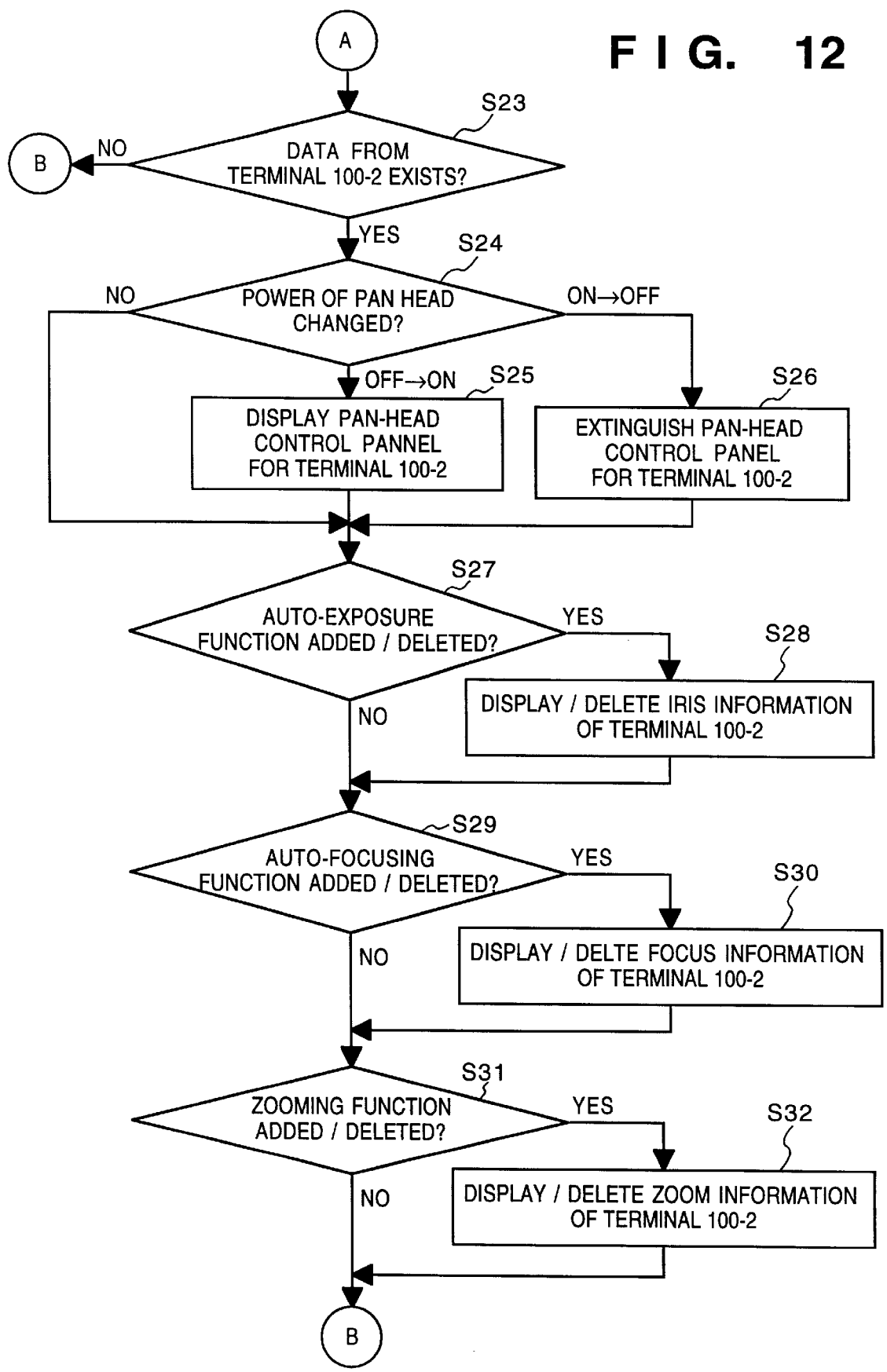

FIGS. 11 and 12 show a process procedure of the visual-telephone terminal according to the second embodiment. The description will be made with reference to FIG. 3.

At step S11, it is examined whether or not the connection between the video camera 10-1 and the pan head 12-1 of the terminal 100-1 has been changed. More specifically, the connection status is detected by communication between the system controller 106 of the video camera 10-1 and the system controller 203 of the pan head 12-1, and the detected connection status is informed to the system controller 304 of the signal processor 310, then the connection status is checked there. When the video camera 10-1 and the pan head 12-1 are separated or connected, the processing is performed in accordance with the procedure as described with reference to the flowchart of FIG. 6. Accordingly, in FIGS. 11 and 12, the explanations of the above case will be omitted. At step S11, it is examined whether or not the status of the power (power supplied or not) of the pan head 12-1 has changed. If the power of the pan head 12-1, which was off, has been turned on, the process proceeds to step S12, at which the pan-head control panel 402 of the terminal 100-1 (FIG. 4) is displayed on the monitor 14-1. At step S13, the communication-destination terminal (100-2) is informed that the pan head 12-1 of the terminal 100-1 has been turned on and the video camera 10-1 has become controllable. Then the process proceeds to step S16. On the other hand, at step S11, if the power of the pan head 12-1, which was on, has been turned off, the process proceeds to step S14, at which the pan-head control panel of the terminal 100-1, displayed on the monitor 14-1, is extinguished. The communication-destination terminal (100-2) is informed that the pan head 12-1 of the terminal 100-1 has been turned off and the video camera 10-1 has become uncontrollable. Then the process proceeds to step S16. Further, if the status of the power of the pan head 12-1 has not changed, the process also proceeds to step S16.

At step S16, the functions of the video camera 10-1 are detected. The detection is made by communication between the system controller 106 of the video camera 10-1 and the system controller 304 of the signal processor 310. At step S17, it is determined whether or not an auto-exposure function has changed, i.e., the function has been newly added or deleted. If it is determined that the auto-exposure function has been added or deleted, the process proceeds to step S18. If the auto-exposure function has been added, iris information on the status of the auto-exposure function is displayed in the control panel 902 (FIG. 9) for the terminal 100-1, and the terminal 100-2 is informed that the video camera 10-1 has the auto-exposure function. On the other hand, if the auto-exposure function has been deleted, iris information in the control panel 902 is deleted, and the terminal 100-2 is informed that the auto-exposure function has been deleted. The process proceeds to step S19, at which it is determined whether or not an auto-focusing function has been changed, i.e., the function has been newly added or deleted. If it is determined that the auto-focusing function has been added or deleted, the process proceeds to step S20. If the auto-exposure function has been added, focus information on the status of the auto-focusing function is displayed in the control panel 902 for the terminal 100-1 (FIG. 9), and the terminal 100-2 is informed that the video camera 10-1 has the auto-focusing function. On the other hand, if the auto-focusing function has been deleted, focus information in the control panel 902 is deleted, and the terminal 100-2 is informed that the auto-focusing function has been deleted. Further, at step S21, it is determined whether or not a zooming function has been changed, i.e., the function has been newly added or deleted. If it is determined that the zooming function has been added or deleted, the process proceeds to step S22. If the zooming function has been added, zoom information on the status of the zooming function is displayed in the control panel 902 for the terminal 100-1, and the terminal 100-2 is informed that the video camera 10-1 has the zooming function. On the other hand, if the zooming function has been deleted, zoom information in the control panel 902 is deleted, and the terminal 100-2 is informed that the zooming function has been deleted.

The process proceeds to step S23, at which it is examined whether or not data from the communication-destination terminal (100-2) exists. If YES, the process proceeds to step S24, at which it is examined whether or not the status of the power of the pan head 12-2 of the terminal 100-2 has changed. If the pan head 12-2 of the terminal 100-2 has changed from off to on, the process proceeds to step S25, at which the pan-head control panel 403 (FIG. 5) for the terminal 100-2 is displayed on the monitor 14-1 of the terminal 100-1, then process proceeds to step S27. If it is determined at step S24 that the status of the pan head 12-2 of the terminal 100-2 has not changed, the process proceeds to step 27.

At step S27, it is determined whether or not an auto-exposure function of the video camera 10-2 of the terminal 100-2 has been changed, i.e., the function has been newly added or deleted. If it is determined that the auto-exposure function has been added or deleted, the process proceeds to step S28. If the auto-exposure function has been added, iris information on the status of the auto-exposure function is displayed in the control panel 903 (FIG. 9) for the communication-destination terminal 100-2. On the other hand, if the auto-exposure function has been deleted, iris information in the control panel 903 is deleted. The process proceeds to step S29, at which it is determined whether or not an auto-focusing function has been changed, i.e., the function has been newly added or deleted. If it is determined that the auto-focusing function has been added or deleted, the process proceeds to step S30. If the auto-exposure function has been added, focus information on the status of the auto-focusing function is displayed in the control panel 903 (FIG. 10) for the terminal 100-2. On the other hand, if the auto-focusing function has been deleted, focus information in the control panel 903 is deleted. Further, at step S31, it is determined whether or not a zooming function has been changed, i.e., the function has been newly added or deleted. If it is determined that the zooming function has been added or deleted, the process proceeds to step S32. If the zooming function has been added, zoom information on the status of the zooming function is displayed in the control panel 903 (FIG. 10) for the terminal 100-2. On the other hand, if the zooming function has been deleted, zoom information in the control panel 903 is deleted.

As described above, according to the present embodiment, in a case where the video camera and the pan head are detachable from each other, the connection status between the video camera and the pan head, and whether or not the camera can be operated by controlling the pan head, are confirmed at a terminal connected to the video camera and the pan head, and at the communication-destination terminal.

Further, the functions of the video camera (auto-exposure, auto-focusing, zooming and the like) can be confirmed at the communication-destination terminal as well as the terminal connected to the video camera. This enables smooth remote control on a video camera of the communication-destination terminal.

Note that the image sensing system using this video camera is applicable not only to the visual telephone/teleconference of the present embodiment, but also to a system where a video camera at a remote place is controlled via a network, for example.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore, to appraise the public of the scope of the present invention, the following claims are made.

What is claimed is:

1. An image-sensing control apparatus comprising:
   image sensing means;
   a pan head for controlling an image sensing direction of said image sensing means;
   detection means for detecting whether or not said pan head and said image sensing means are connected to each other; and
   display control means for controlling a displaying status of a control panel for designating the image sensing direction by the pan head based on a detection detected by said detection means.

2. The image sensing control apparatus according to claim 1, wherein said detection means detects whether or not said pan head and said image sensing means are physically connected.

3. The image-sensing control apparatus according to claim 1, wherein said detection means detects whether or not said pan head and said image sensing means are electrically connected.

4. The image-sensing control apparatus according to claim 3, wherein said detection means detects status of electricity-supply to said pan head.

5. The image-sensing control apparatus according to claim 1, wherein if said detection means detects that said pan head and said image sensing means are not connected to each other, said display control means does not display the control panel.

6. The image-sensing control apparatus according to claim 1, wherein said display control means displays the control panel, if said detection means detects that said pan head and said image sensing means are connected to each other.

7. The image-sensing control apparatus according to claim 1, wherein said said image sensing means is placed on the pan head.

8. An image-sensing control method for an image sensing control apparatus for controlling image sensing means and a pan head for controlling an image sensing direction of said image sensing means, comprising:
   a detection step of detecting whether or not said pan head and said image sensing means are connected to each other; and
   a display control step of controlling a displaying status of a control panel for designating the image sensing direction by the pan head based on a detection detected at said detection step.

9. The image-sensing control method according to claim 8, wherein at said detection step, whether or not said pan head and said image sensing means are physically connected is detected.

10. The image-sensing control method according to claim 8, wherein at said detection step, whether or not said pan head and said image sensing means are electrically connected is detected.

11. The image-sensing control method according to claim 10, wherein status of electricity-supply to said pan head is detected at said detection step.

12. The image-sensing control method according to claim 8, wherein if it is detected at said detection step that said pan head and said image sensing means are not connected with each other, the control panel is not displayed at said display control step.

13. The image-sensing control method according to claim 8, wherein in said display control step, the control panel is displayed, if it is detected at said detection step that said pan head and said image sensing means are connected to each other.

14. An image sensing system which transmits at least image information via a transmission line, comprising:
   an image sensing apparatus which converts an optical image of an image-sensed object into an electrical signal;
   a pan head for controlling an image sensing direction of said image sensing apparatus;
   detection means for detecting whether or not said pan head and said image sensing apparatus are connected;
   notification means for notifying connection status between said pan head and said image sensing apparatus, detected by said detection means, to a communication-destination apparatus, via said transmission line; and
   display control means for controlling a displaying status of a control panel for designating the image sensing direction of said image sensing apparatus based on the connection status detected by said detection means or based on the connection status received from said communication-destination apparatus via said transmission line.

15. The image sensing system according to claim 14, wherein said display control means displays the control panel, when said pan head and said image sensing apparatus are connected to each other, thus enabling image sensing in the image sensing direction designated by said control panel.

16. The image sensing system according to claim 14, wherein said detection means detects whether or not said image sensing apparatus and said pan head are physically connected.

17. The image sensing system according to claim 14, wherein said detection means detects whether or not said image sensing apparatus and said pan head are electrically connected.

18. The image-sensing system according to claim 17, wherein said detection means detects status of electricity-supply to said pan head.

19. The image sensing system according to claim 15, wherein if said detection means detects that said pan head and said image sensing apparatus are not connected to each other, said display control means does not display the control panel for designating the image sensing direction of said image sensing apparatus controlled by said pan head.

20. A storage medium containing a program for executing an image-sensing control method for an image-sensing control apparatus having image sensing means and a pan head for controlling an image sensing direction of said image sensing means, said program comprising:

a detection process module for detecting whether or not said pan head and said image sensing means are connected to each other; and a display control process module for controlling a displaying status of a control panel for designating the image sensing direction by the pan head based on a detection detected at said detection process module.

21. The storage medium according to claim 20, wherein at said detection process module, whether or not said pan head and said image sensing means are physically connected is detected.

22. The storage medium according to claim 20, wherein at said detection process module, whether or not said pan head and said image sensing means are electrically connected is detected.

23. A computer-readable storage medium containing a program for executing an image-sensing control method for an image-sensing control apparatus having image sensing means and a pan head for controlling an image sensing direction of said image sensing means, said program comprising:

a function detection process module for detecting a function of said image sensing means; and a function display process module for controlling a displaying status of a control panel for designating the image sensing direction of said image sensing means based on the result of detection at said function detection process module.

24. The storage medium according to claim 23, wherein the function of said image sensing means includes at least one of auto-exposure function, auto-focusing function and zooming function.

25. The storage medium according to claim 23, further comprising a display control process module for displaying the function detected at said function detection process module on a monitor.

* * * * *